Aug. 28, 1956
R. L. TAUTY
2,760,741
PARACHUTE CONTAINER
Filed April 21, 1955
3 Sheets-Sheet 1
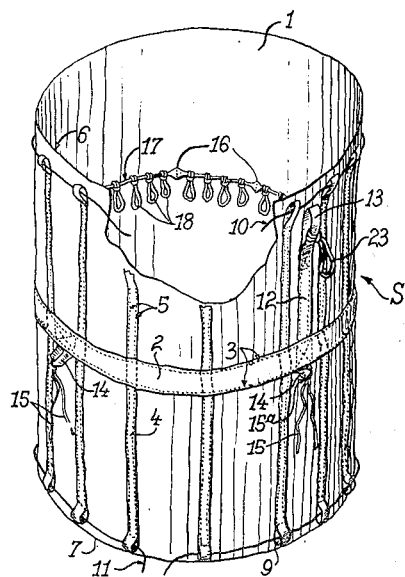
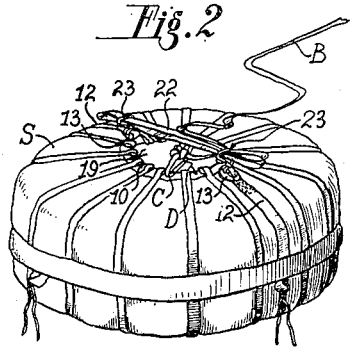
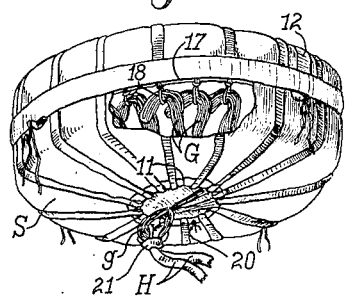
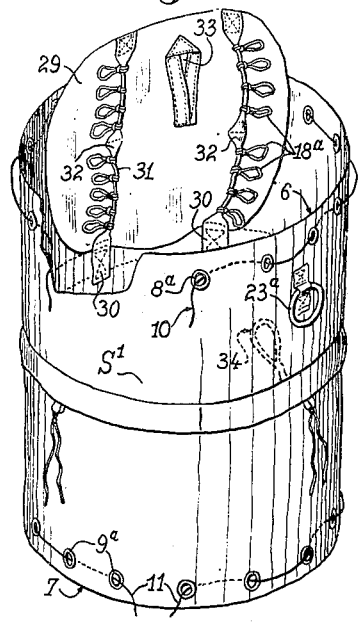
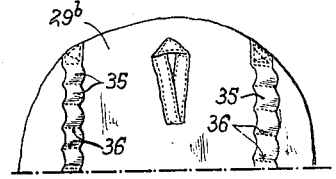
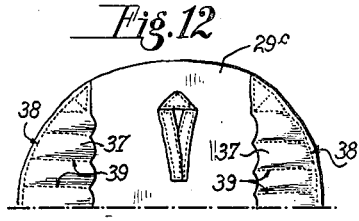
*INVENTOR:*
*RENÉ LOUIS TAUTY*
By
Richardson, David and Nordon
ATTYS

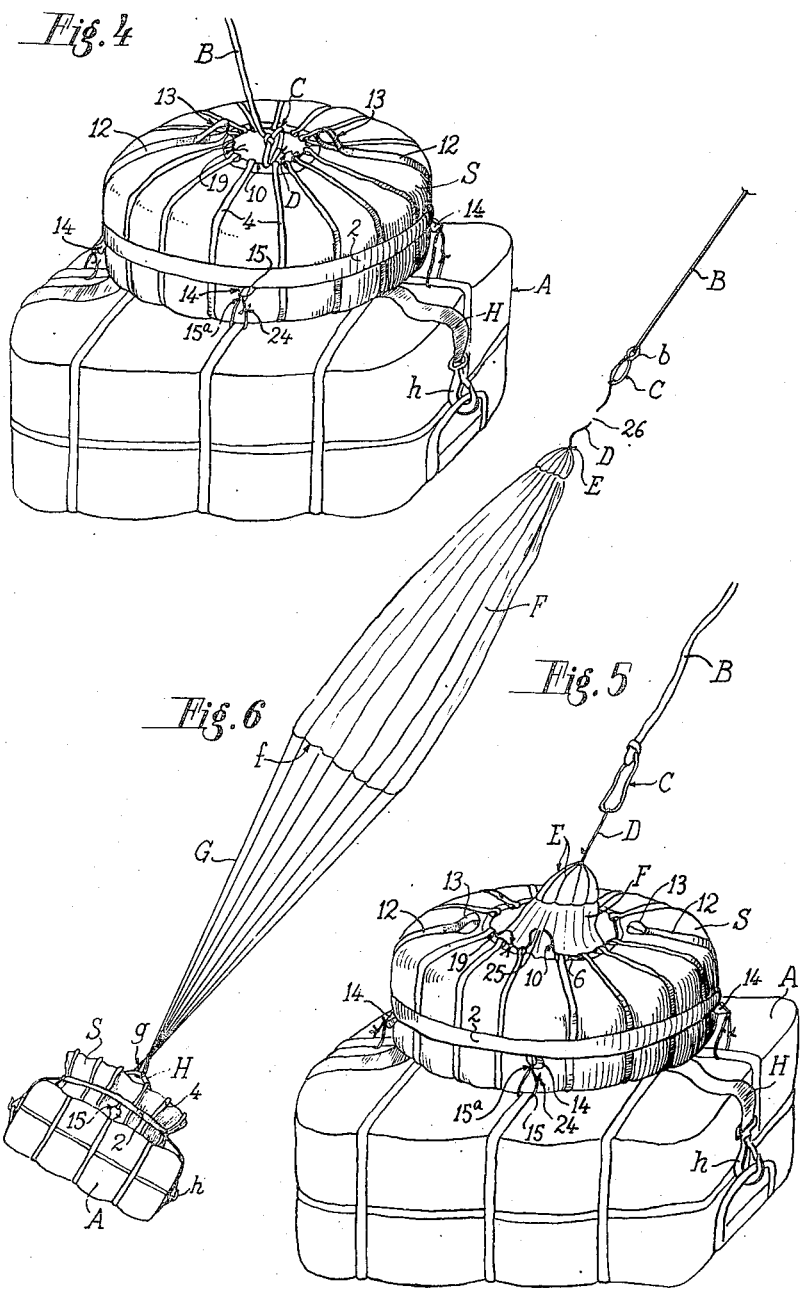

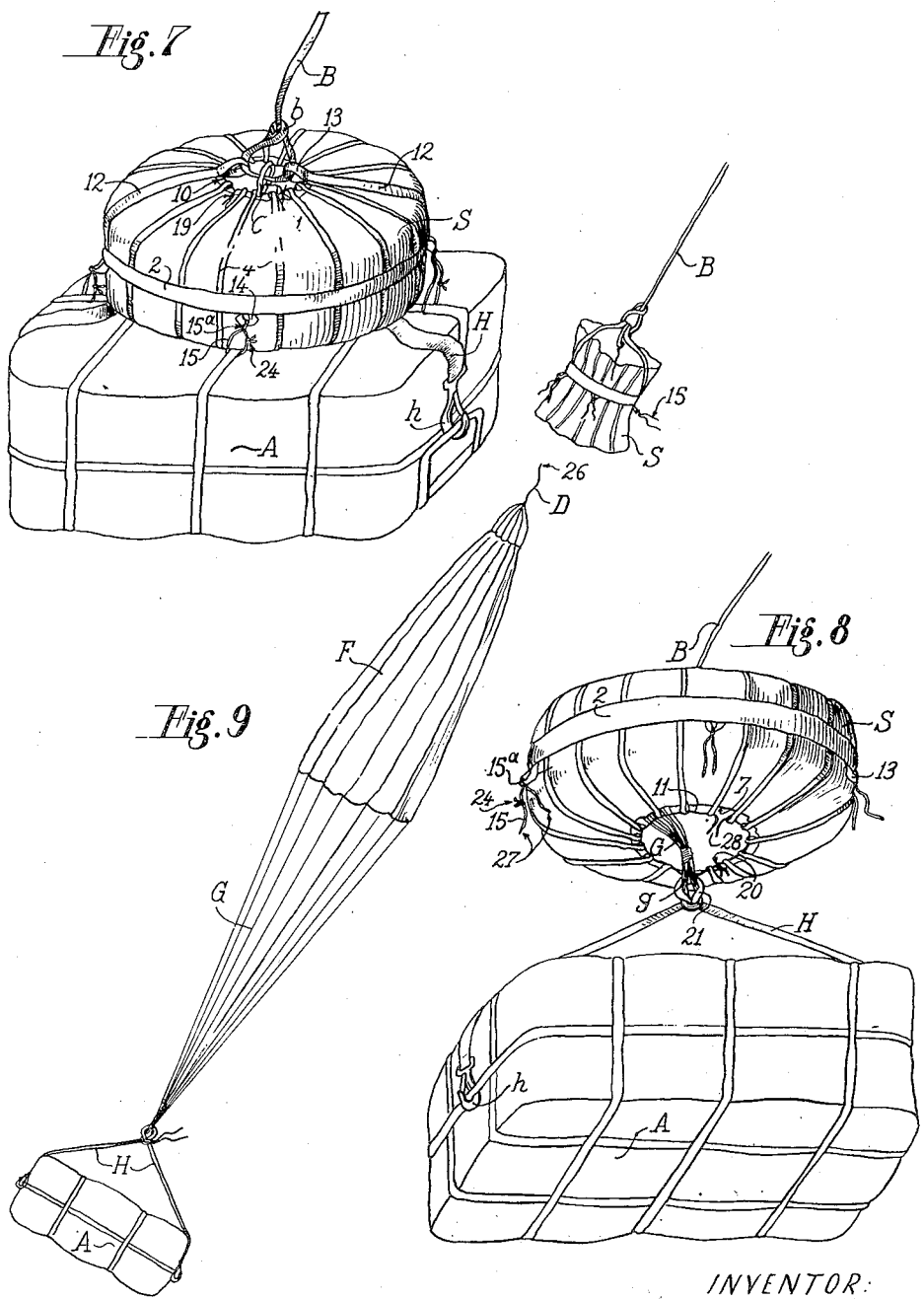

United States Patent Office 2,760,741
Patented Aug. 28, 1956

2,760,741

PARACHUTE CONTAINER

René Louis Tauty, Stains, France, assignor to Etudes et Fabrications Aeronautiques, Paris, France, a French body corporate Application April 21, 1955, Serial No. 502,813

Claims priority, application France April 23, 1954

7 Claims. (Cl. 244—148)

The present invention relates to parachutes and in particular those used in the parachuting of inert loads (material, food supplies, etc.) and has for object to provide an improved parachute container.

It is known that an opened parachute comprises in series relation between the parachuting aircraft and the load; an automatic opening strap, a strop passing through the binding cord of the container or pack and connected to the apex of the parachute by a cord or the like having a limited strength and adapted to break when the parachute has completely opened, the parachute itself comprising the canopy and the suspension lines leading to one or several loops, and one or several lashing straps which pass through said loops and terminate in snap-hooks or like devices permitting attachment of the load.

When not in use, the above-described assemblage is enclosed in a container which is adapted to open when the load is jettisoned so as to release the parachute, this container being connected to the load until the moment of parachuting.

Two methods are known for withdrawing the parachute from its container.

The first method, or "canopy first" method, consists in withdrawing the canopy through the side or end of the container remote from the load, the suspension lines following; in this method the container remains attached to the load.

The second method, or "suspension lines-first" method, consists in initially withdrawing the suspension lines through the side or end of the container adjacent the load, the canopy following; in this method the container remains attached to the automatic opening strap, which is, in turn, attached to the aircraft.

The canopy-first method affords a more rapid but somewhat abrupt opening and is advisable only for parachuting from low altitudes.

The suspension lines-first method is less violent in operation but of course necessitates a longer opening period.

The design of parachute containers or packs of conventional type is such that they only permit one or the other of these opening methods to be used. Now, this constitutes a serious disadvantage, since it requires a permanent stock of both types of containers with their canopies; furthermore, it is necessary to decide, before taking off, which of the two methods is to be used, and if the flying conditions at the parachuting point are not those forecast, the parachuting is likely to be carried out under bad conditions; for example, if the load is fixed to parachutes opened in accordance with the suspension lines-first method, this requires flying at relatively high altitude, whereas the prevailing visibility may require parachuting at low altitudes.

The purpose of the invention is to remedy the above-mentioned disadvantages in providing parachuting equipment permitting either of the two opening methods to be selected, to suit local parachuting conditions, by means of a very simple operation which may be carried out several minutes before parachuting.

The object of the invention is more particularly to provide a container for a parachute permitting either the canopy-first or suspension lines-first opening method to be used with the same parachute and container.

A further object of the invention is to provide a container comprising a tubular sheath of cloth or other flexible material which is provided at each end with first loops or the like permitting two binding elements to be passed therethrough for closing the container by gathering these ends together, these binding elements being capable of breaking when subjected to a tractive force of the order of several tens of kilos, there being rigidly secured on this sheath, firstly, two second loops or the like which have a strength of the same order as the automatic opening strap of the parachute and in which this strap may be engaged for the purpose of opening the container at its lower end by traction on the suspension lines and, secondly, third loops or the like for securing the container to the load to be parachuted by break cords, these cords being such that together they are capable of withstanding a limited tractive force which is less than that capable of being exerted by the load at the end of its free fall preceding the opening of the parachute, but which is, however, distinctly greater than the force each of the two binding elements for the container is capable of withstanding, whereby the latter opens at its upper end by traction on the canopy and breakage of the corresponding binding element, if the automatic opening strap has not been engaged in said second loops.

As this container is closed at both ends:

(a) In the canopy-first method of opening in which the canopy is the first to be drawn out of the container in the upward direction, it is sufficient to dispose in the loop, which is formed at the end of the automatic opening strap and is normally connected to the parachute by the strop and the break cord connected to the apex of the canopy, the corresponding binding element so that the latter, which is weaker than the assemblage of break cords fixing the container to the load, breaks in the course of parachuting and the container opens at its upper end, that is, the end adjacent the canopy.

(b) In the suspension lines-first method in which the suspension lines are the first to be pulled out of the container, it suffices to pass the automatic opening strap through the very strong loops of the container which is thus securely attached to this strap so that, in the course of parachuting, the break cords fixing the container to the load break and also cause the breakage of the binding element closing the adjacent lower end of the container, this occurring only if this binding element has been engaged in the end loop of the suspension lines or in the loop by which the usual lashing strap is connected to the suspension lines.

A further object of the invention is to provide the assemblage for parachuting comprising the above-mentioned container and the corresponding parachute folded up inside the container, the closure of which is obtained by said upper and lower binding elements, one of which is engaged in the end loop of the automatic opening strap and the other in the loop connecting the lashing strap or straps to the end of the suspension lines.

Further features and advantages of the invention will be apparent from the ensuing description.

In the accompanying drawings given merely by way of example:

Fig. 1 is a perspective view of a parachute container embodying the invention;

Fig. 2 is a perspective view of this container in its closed position seen from the end thereof connected to the automatic opening strap;

Fig. 3 is a similar perspective view, with a part cut away, showing the lower end of the container, that is, the end adapted to be applied against the load to be parachuted;

Fig. 4 is a perspective view of the container containing the parachute in its folded position and secured to the load to be parachuted, the automatic opening strap being adapted to open the container by a direct traction on the canopy;

Fig. 5 is a similar view showing the commencement of the withdrawal of the canopy;

Fig. 6 is a view of the parachute in its open position at the moment when the break cord connecting the automatic opening strap to the apex of the canopy, breaks;

Figs. 7, 8 and 9 are similar views of the parachute container when applied to the suspension lines-first opening method;

Fig. 10 is a perspective view of a modification of the container, and

Figs. 11 and 12 are partial views of modifications of the suspension line coiling aprons.

For the purpose of describing the invention, reference will be had first to Fig. 6 which shows the assembly of the extended parachute at the moment when the parachuted load A has just been released. This parachute comprises, starting from the end thereof adjacent the aircraft (not shown): an automatic opening strap B connected by a loop $b$ to the strop C which a break cord D connects to the halyards E of the apex of the canopy F; secured to the periphery $f$ of this canopy are the suspension lines G which terminate in at least one loop $g$ in which is engaged the lashing strap or straps H which, in turn, terminate in snap-hooks $h$ for hooking the straps to the load A.

When transporting and at the moment of jettisoning the load A, the canopy F and suspension lines G are enclosed in the container S which is more particularly the object of the invention.

According to the embodiment shown in Figs. 1 to 3, this container, shown in the open state, comprises a tubular sheath 1 of cloth or other flexible material having sufficient diameter and length to contain the parachute assemblage. Means are provided for closing the container by drawing the upper and lower ends of the sheath together, as shown in Figs. 2 and 3.

This container is reinforced intermediate of its ends by an outer band or strap 2 fixed to the sheath by two rows of stitching 3.

Interposed between this main band 2 and the sheath are longitudinal bands 4, each of which is stitched to the sheath by two longitudinal rows of stitching 5, these longitudinal bands terminating, at each end in the vicinity of the upper and lower open ends 6 and 7 of the container, in loops 8 and 9 through which extend a binding or lacing element 10 and 11 such as a cord or thread. These binding elements are capable of breaking when subjected to a tractive force of the order of 25 kilos.

Also provided adjacent the end 6 are two longitudinal diametrically opposed bands or straps 12 which are capable of withstanding a tractive force comparable to that withstood by the automatic opening strap B, i. e. they are capable of supporting, without breaking, a load of, for example, about 1000 kilos which is distinctly greater than the maximum weight of the load H. Each of these bands terminates in a loop 13 of similar strength.

Towards the lower end 7 of the container the latter carries a number of further external loops 14 or the like, for example four equispaced loops. Extending through each of these loops and held by a knot 15$^a$, is a cord 15 or the like which has a strength similar to that of the binding elements 10 and 11. Thus, if the strength of each of these cords 15 is of the order of 25 kilos, the assemblage of these cords is capable of withstanding a traction of the order of $8 \times 25 = 200$ kgs. owing to the fact that both strands of each cord 15 is used.

Disposed along the inner wall of the container at substantially the level of the strap 3, and held in position by stitching 16 (Fig. 1) is another strap or band 17 (Figs. 1 and 3) on which may be engaged the removable elastic loops 18 adapted to retain or support the suspension lines G of the parachute.

The container S is used in the following manner:

Assuming the container to be in the open position shown in Fig. 1, the parachute assemblage is packed in. For this purpose, the upper end 6 of the container is closed by means of the binding element 10, the two ends of which are knotted at 19 after having taken care to pass them through the strop C (Figs. 2 and 4) to which had been previously secured the break cord D. Thus the end 6 of the container is gathered together and the resultant opening is of considerably reduced size, as may be seen in Figs. 2 and 4.

As will be understood, the binding element 10 is tightened in accordance with the volume of the parachute packed in the container; the latter therefore affords considerable latitude in respect of parachute sizes it is capable of receiving.

If a small parachute is packed in the container, the binding element 10 is pulled tight; if a large parachute is packed in the container, the loops 8 are merely brought into contact with one another without overlapping and the remaining opening may be closed by means of a disc of paper or cloth cut to size.

The container is then placed on a table on its closed end 6, and the canopy F is introduced through the open end 7 starting with its apex end. The break cord D already secured to the strop C is fixed to the halyards E of the canopy. The latter is then carefully pleated in the manner of an accordian in the usual manner inside the container, care being taken to arrange the pleats over the entire area of the container so as to take up the smallest possible space. The suspension lines G are then coiled, and each loop or coil is connected to one of the elastic loops 18 detachably secured to the band 17.

The binding element 11 previously passed through the loops 9 of the bands 4 is then engaged in the loop or loops $g$ of the suspension lines G, the two ends of this element 11 being knotted at 20. The binding element 11 is tightened as much as possible before knotting and the pleats of the end of the container are neatly fitted one under the other.

The or each lashing strap H for the load A is fixed midway of its ends by a loop or knot 21 (Fig. 3) to the loop or loops $g$ of the suspension lines G, so that the binding element 11 is securely fixed to the lashing strap or straps H.

In the illustrated embodiment it has been assumed for reasons of simplicity that only one loop $g$ and lashing strap H is provided.

The assemblage of the parachute and the container forms a unit which is very easily transported and stored with the automatic opening strap B, which may be fixed to the upper part of this container in accordance with either one of the methods described hereinafter. This strap B may be coiled as illustrated at 22 in Fig. 2, superimposed folds of the strap being for example engaged in two elastic bands secured to the base of the strong loops 13 (Figs. 1 and 2).

To parachute the load A, the unit comprising the parachute and the container is fixed to the load by not only the snap-hook $h$ of the or each lashing strap H (Figs. 4, 5, 7 and 8) but also break cords 15 or the like, the two ends of which are knotted at 24 (Figs. 5 and 7).

The automatic opening strap B is secured to the unit in accordance with either one of the methods described below depending on whether the canopy-first method, or the suspension lines-first method of opening the parachute, is desired.

The manner in which the automatic opening strap B is attached for each of these methods and the behaviour of the unit in the course of parachuting will be examined in turn.

*Opening by the canopy-first method.*—Referring to Figs. 4 and 6, in this method of withdrawing the parachute, the automatic opening strap B is simply connected, by means of a loop or knot formed with its loop $b$, to the strop C, which the break cord D connects to the halyards E of the apex of the parachute F.

With this manner of assembling, when parachuting, the entire weight of the parachuted unit including the parachute is carried by the binding member 10 which, having a tensile strength of the order of 25 kilos, breaks as shown at 25 in Fig. 5. Thenceforth, the container is no longer closed at its upper end and it permits the progressive withdrawal of the parachute (Fig. 5) since the latter is temporarily connected to the aircraft by the elements E, D, C, B as the remainder of the parachuted unit falls.

After the canopy F has been withdrawn from the container, the suspension lines issue from the upper end of the latter until the parachute is completely extended and the break cord D breaks at 26 (Fig. 6). The parachuted load, suspended by the lashing strap H from the loop or loops $g$ of the suspension lines G, continues to descend with the parachute while the canopy F opens. The open container S remains attached to the load A by the break cords 15.

*Opening by the suspension lines-first method.*— Reference will be had to Figs. 7, 8 and 9. The load A is secured to the parachute and to the container S in the same manner as the first case. The loop $b$ of the automatic opening strap B, however, extends through not only the strop C (through which extends the binding element 10 knotted at 19) but also the two loops 13 of the two strong bands 12.

With this assembly, when parachuting, the load A assumes such velocity in falling that its kinetic energy is sufficient to break the four break cords 15 at 27 (Fig. 8) when the strap B is fully extended. Thenceforth, the container 2 is released from the load A while remaining attached to the automatic opening strap B owing to the connection of the latter to the two strong loops 13. Thus, the container S immediately separates from the load A and the latter exerts, through the medium of the lashing strap H and the knot 21, a tractive force on the loop or loops $g$ of the suspension lines G. As the binding element 11 is engaged in the loop or loops $g$, this element breaks, for example at 28 (Fig. 8), and the container is opened at its lower end 7 and permits the suspension lines G to emerge, the latter in turn withdrawing the canopy F. The container S remains attached to the aircraft by the automatic opening strap B.

Shortly thereafter, the break cord D breaks, for example at 26, and the released load descends with its opened-out parachute, the container S being hauled into the aircraft.

As will be understood, it is very easy to change from one parachuting method to the other within a few minutes, for example just before parachuting, since the sole operation consists in the modifying the attachment of the automatic opening strap B (compare Figs. 4 and 7).

Fig. 10 illustrates a modification of the container S¹. The latter differs from the above-described container in the following manner: The loops 8 and 9 of the above-described example adapted to receive the binding elements 10 and 11 are replaced by eyelets 8ª and 9ª; the two strong loops 13 of the above-described example are replaced by two metal rings 13ª the band 17 adapted to receive the elastic loop 18 for the suspension lines G is replaced by an apron 29 or the like of cloth or other flexible material which is fixed by two tabs 30 to the inner wall of the container S¹. This apron comprises, disposed on its side adjacent the end 7 when the apron is situated in a transverse plane of the container, two straps, thongs or the like, 31, secured at 32 to this apron. Elastic loops 18ª adapted to receive the suspension lines are detachably secured to these straps 31.

An eyelet 33 or the like is also provided on this apron and is adapted to hold the apron temporarily in a position perpendicular to the longitudinal axis of the container by co-operating with an additional elastic loop 34 secured to the inside of the container. Before coiling the suspension lines, this loop 34 is passed through the eyelet 33 from the upper side of the apron (not seen in Fig. 10) and the first coil of the suspension lines is engaged in this loop. Thus the apron is temporarily held in position in a flat state on top of the canopy, the remainder of the suspension lines being thereafter coiled in the elastic loops 18ª.

This temporary looping of the apron permits, in the course of withdrawing the parachute from the container (suspension lines first), the free release of the successive coils without danger of the apron tipping downwardly about the tabs 30 and perhaps hindering withdrawal.

On the other hand, if the canopy is the first to be withdrawn from the container, as soon as this canopy has left the latter, it pulls on the suspension lines which immediately disengage from the loop 34, and the apron 29 is released and raised to the illustrated position (Fig. 10), which permits a very easy disengagement of the suspension lines from the loops 18ª.

Fig. 11 illustrates a modification of the apron 29ᵇ in which the loops 18ª of the preceding example are replaced by two bands 35 connected to the apron 29ᵇ by transverse stitching 36 so as to form passageways in each of which is engaged one of the coils or loops of the suspension lines.

Fig. 12 shows another modification of the apron 29ᶜ in which the passageways of the preceding example are blind or closed in that the bands 35 of the preceding example are replaced by elements 37 of cloth or other material sewn at 38 to the apron 29ᶜ so as to form pockets 39.

Although specific embodiments of the invention have been described hereinbefore, the invention is not limited thereto since many modifications and changes may be made therein without departing from the spirit of the invention or the scope of the appended claims.

The apron shown in Figs. 10, 11 or 12 may be fixed to one of the suspension lines or may be free.

Having now described my invention what I claim as new and desire to secure by Letters Patent is:

1. Container for a parachute provided with an automatic opening strap B and adapted for the parachuting of a load, said container comprising: a tubular sheath 1 of a flexible material constituting the body of the container; a series of elements 9 disposed around the entire outer periphery of this sheath at the upper end 6 and lower end 7, said series of elements being adapted to receive a flexible binding element slidable therein; two flexible binding elements 10 and 11 each of which is engaged in said elements 9 of one or the other of the ends of the sheath and adapted to close the container by drawing said ends together, these binding elements being capable of breaking under the action of a small tractive force of the order of some tens of kilograms; two loops 13 fixed to the outer face of said sheath adjacent said upper end and having high strength so that they are capable of withstanding without breaking a force greater than the force exerted by the weight of the load to be parachuted; and break cords 15 fixed to said outer face of the sheath adjacent its lower end and adapted to attach the container to the load to be parachuted, the strength of these break cords being such as to withstand, together, a small tractive force which is less than that which the load is capable of exerting at the end of its free fall which precedes the opening of the parachute but which is distinctly greater than the strength of each of the two binding elements 10, 11 of the container, whereby the latter opens at its lower end or its upper end according to whether said automatic opening strap is or is not engaged in said loops 13.

2. Container for a parachute provided with an automatic opening strap B and adapted for the parachuting of a load, said container comprising a tubular sheath 1 of a flexible material constituting the body of the container; a series of elements 9 disposed around the entire outer periphery of this sheath at its upper and lower ends, said series of elements being adapted to receive a flexible binding element slidable therein; two flexible binding elements 10, 11 each of which is engaged in said elements 9 of one or the other of the ends of the sheath and adapted to close the latter by drawing said ends together, said binding elements being capable of breaking under the action of a small tractive force of the order of several tens of kilograms; two loops 13 fixed to the outer face of said sheath at two diametrically opposed points and having a strength much greater than that of said binding elements, this strength being of the same order as that of said automatic opening strap B of the parachute and in which loops may be engaged in the latter; fixing elements 14 fixed to the outer face of said sheath; and break cords 15 attached to said fixing elements and adapted to attach the container to said load, the strength of these break cords being such that they are capable of withstanding, together, a small tractive force which is less than that which said load is capable of exerting at the end of its free fall preceding the opening of the parachute but which is distinctly greater than the strength of each of the two binding elements 10, 11, whereby the container opens at its upper end or its lower end according to whether the automatic opening strap is or is not engaged in said loops 13.

3. Container for a parachute adapted for the parachuting of a load attached by suspension lines G to a canopy F which is connected to an automatic opening strap B, said container comprising a tubular sheath 1 of a flexible material forming the body of the container; a series of elements 9 disposed around the entire outer periphery of this sheath and at the upper and lower ends thereof, said series of elements being adapted to receive, slidable therein, a flexible binding element, two flexible binding elements 10, 11 each of which is engaged in said elements 9 of one or the other of the ends of the sheath and adapted to close the latter by drawing said ends together, these binding elements being capable of breaking under the action of a small tractive force of the order of some tens of kilograms; two loops 13 fixed to the outer face of said sheath 1 and having a strength of the same order as that of said automatic opening strap B and in which may be engaged the strap for the purpose of opening the container at the lower end of the latter by traction on said suspension lines G of the parachute; fixing elements 14 fixed to said outer face of the sheath; and break cords 15 attached to said fixing elements and adapted to attach the container to said load, the strength of these break cords being such that they are capable of withstanding, together, a tractive force which is less than that which the load is capable of exerting at the end of its free fall which precedes the opening of the parachute but which is distinctly greater than the strength of each of the two binding elements 10, 11, whereby the container opens at its upper end as a result of traction on the canopy and breakage of the corresponding binding element 10 if the automatic opening strap B is not engaged in said loops 13.

4. Container for a parachute adapted for the parachuting of a load attached by suspension lines G to a canopy F connected to an automatic opening strap B, said container comprising a tubular sheath 1 of a flexible material constituting the body of the container; a series of elements 9 disposed around the entire outer periphery of the sheath and at the upper and lower ends of the latter, said series of elements being adapted to receive, slidable therein, a flexible binding element; two flexible binding elements 10, 11 each of which is engaged in said elements 9 of one or the other of the ends of the sheath and adapted to close the latter by drawing together said ends, these binding elements being capable of breaking under the action of a small tractive force of the order of some tens of kilograms; two loops 13 fixed to the outer face of said sheath and having a strength of the same order as that of said automatic opening strap B and in which may be engaged the latter for the purpose of opening the container at its lower end by means of a traction on said suspension lines G; fixing elements 14 fixed to said outer face of the sheath; break cords 15 attached to said fixing elements and adapted to attach the container to said load, the strength of these break cords being such that they are capable of withstanding, together, a small tractive force which is less than that which the load is capable of exerting at the end of its free fall preceding the opening of the parachute but which is distinctly greater than the strength of each of the two binding elements 10, 11, whereby the container opens at its upper end by traction on the canopy and breakage of the corresponding binding element 10 if the automatic opening strap B has not been engaged in said loops 13; and elastic loops of rubber disposed inside the sheath for the coiling of the suspension lines.

5. Container as claimed in claim 4, wherein said elastic loops are fixed to the inner face of the sheath substantially mid-way the ends of, and disposed around the entire periphery of, the sheath.

6. Container as claimed in claim 4, wherein said apron as pivoted to the sheath of the container so that it is capable of pivoting upwardly or downwardly according to the manner of withdrawing the parachute.

7. Unit for parachuting a load comprising in combination: on the one hand, a parachute comprising in series relation and connected together, an automatic opening strap B, a strop C, a canopy F connected to the latter by a cord 26 of limited strength adapted to break at the end of the opening of the parachute, suspension lines G connected to the canopy and terminating in at least one loop g, and at least one lashing strap H which extends through said loop and is provided for attaching said load, and on the other hand, a container in which the parachute is packed and which comprises: a tubular sheath 1 of a flexible material constituting the body of the container; a series of elements 9 disposed along the entire outer periphery of the sheath at the upper and lower ends of the latter, said series of elements being adapted to receive, slidable therein, a flexible binding element, two flexible binding elements 10, 11 each of which is engaged in said elements of one or the other of the ends of the sheath, these binding elements being provided for closing the container by drawing together said end above the packed parachute and being capable of breaking under the action of a small tractive force of the order of some tens of kilograms; two loops 13 fixed to the outer face of said sheath and having a strength of the same order as that of the automatic opening strap B and in which the latter may be engaged for the purpose of opening the container at the lower end of the sheath by traction on the suspension lines G; fixing elements 14 fixed to the outer face of the sheath; break cords 15 attached to said fixing elements and adapted to attach the container to the load, the strength of these break cords being such that they are capable of withstanding, together, a small tractive force which is less than that which the load is capable of exerting at the end of its free fall preceding the opening of the parachute but which is distinctly greater than the strength of each of the two binding elements 10, 11, whereby the container opens at its upper end by traction on the canopy and breakage of the corresponding binding element 10 if said automatic opening strap B has not been engaged in said loops 13.

References Cited in the file of this patent
UNITED STATES PATENTS

| | | |
|---|---|---|
| 2,583,905 | Thompson | Jan. 29, 1952 |
| 2,687,263 | Frieder | Aug. 24, 1954 |